United States Patent [19]

Hashimoto et al.

[11] Patent Number: 5,230,845
[45] Date of Patent: Jul. 27, 1993

[54] PROCESS FOR PRODUCING A CERAMIC PRODUCT FOR USE AS A CONSTRUCTION MATERIAL

[75] Inventors: Ryusuke Hashimoto, Aichi; Minoru Iwase, Gifu, both of Japan

[73] Assignee: Fujimi Ceramic Co., Ltd., Nagoya, Japan

[21] Appl. No.: 743,740

[22] Filed: Aug. 12, 1991

[30] Foreign Application Priority Data

Feb. 28, 1991 [JP] Japan ................................. 3-59356

[51] Int. Cl.$^5$ ............................................. C04B 35/64
[52] U.S. Cl. ........................................ 264/56; 264/63; 501/155
[58] Field of Search ................... 264/56, 63; 501/155

[56] References Cited

U.S. PATENT DOCUMENTS 4,874,153 10/1989 Hashimoto .......................... 264/63

OTHER PUBLICATIONS

Parmelee Cullen W. Ceramic Glazes, Industrial Publications Inc., Chicago Ill., 1951, pp. vi, vii, viii, ix, 38–53.

Primary Examiner—James Derrington
Attorney, Agent, or Firm—Lahive & Cockfield

[57] ABSTRACT

The invention provides a process for producing a ceramic product for use as a construction material. According to the process of the invention, 2 to 50% by weight, based on the total weight, of sludge ashes containing 0.3 to 0.8 mole of CaO in Seger formula, 0.1 to 0.5 mole of MgO in Seger formula, and 0.2 mole or more of $P_2O_5$ in Seger formula is added to a ceramic raw material. A desired percentage can be selected from the range of 2 to 50% to produce a ceramic product with desired properties. Also, according to the invention, a molded body can be fired at a temperature lower than a temperature used to fire a molded body with no sludge ashes to produce a ceramic product which is comparable to a ceramic product produced by firing the latter molded body. That is, according to the invention, a molded body can be fired at a temperature of 900° to 1,200° C. to produce such a ceramic product.

5 Claims, 4 Drawing Sheets

Bulk specific gravity

Shrinkage percentage

Water absorption

Bending strength

Bulk specific gravity (Sludge ashes used)

Shrinkage percentage

Water absorption

Bending strength

Bulk specific gravity (Sludge ashes used)

Shrinkage percentage

Water absorption

Bending strength

Bulk specific gravity

----- 1150°C
—·— 1100°C
——— 1050°C

% (Sludge ashes used)

Shrinkage percentage

Water absorption

Bending strength

PROCESS FOR PRODUCING A CERAMIC PRODUCT FOR USE AS A CONSTRUCTION MATERIAL

FIELD OF THE INVENTION

This invention relates to a process for producing ceramic products for use as construction materials, such as bricks, wall tiles and roofing tiles, and more particularly to such a process whereby ashes prepared by burning a sludge obtained by sewage treatment are added to a ceramic raw material.

PRIOR ART

In any community an astonishing amount of waste materials accumulates every day. Certain wastes are carried away by water through a sewage system to a sewage treatment plant. The quantity of such wastes, or sewage, is enormous. Treatment of sewage in a sewage treatment plant produces sludge. Sludge must be disposed of in one way or another. On the other hand, it is well known that sludge contains no small quantity of valuable resources. One of the ways to utilize sludge has been to burn it and add a usual ceramic raw material to sludge ashes to produce a brick or tile.

PROBLEM OF PRIOR ART

As described above, sludge must be disposed of in one way or another. An effective way to consume as much sludge as possible with little time and trouble has been sought after. Then, in the prior art, a ceramic product has been produced which is mostly composed of sludge ashes. Only a very small amount of usual ceramic raw material has been added to sludge ashes. There have even been cases where only sludge ashes are used to produce a ceramic product. Thus, the prior art has been developed with little thought of the quality of the product. The prior art has failed to produce a ceramic product which contains sludge ashes, but is of good quality, or is comparable in quality to a ceramic product produced by using only usual ceramic raw material. Thus, the prior art has failed to produce a ceramic product which contains sludge ashes, but can be successfully manufactured on a commercial basis. Hence, the prior art has failed to achieve its original object, namely, the consumption of as much sludge as possible.

MEANS FOR SOLVING PROBLEM

Accordingly, the invention provides a process for producing a ceramic product which contains sludge ashes in addition to usual raw ceramic material, but is comparable in quality to a ceramic product produced by using only usual ceramic raw material. The process of the invention employs sludge ashes which contain selected amounts of basic components (CaO and MgO) and a selected amount of acid component ($P_2O_5$). To be exact, sludge ashes containing 0.3 to 0.8 mole of CaO in Seger formular, 0.1 to 0.5 mole of MgO in Seger formula, and 0.2 mole or more of $P_2O_5$ in Seger formula are employed. Also, according to the process of the invention, such sludge ashes are used by a percentage selected from a fixed range. To be exact, 2 to 50% by weight (based on the total weight of a mixture) of such sludge ashes is added to and mixed with a usual ceramic raw material. The mixture is fired at a temperature of 900° to 1,200° C.

SUMMARY OF THE INVENTION

An object of the invention is to provide a process for producing a ceramic product which contains sludge ashes in addition to usual raw ceramic material, but is comparable in quality to a ceramic product produced by using only usual ceramic raw material.

Another object of the invention is to provide a process for producing a ceramic product whereby sludge ashes are mixed with a usual ceramic raw material to prepare a body and the body can be fired at a temperature lower than a temperature used to fire a body with no sludge ashes.

PERFORMANCE

According to the invention, 2 to 50% by weight of sludge ashes is mixed with a usual ceramic raw material to prepare a body. The body is molded into a desired shape. The molded body is fired at a temperature of 900° to 1,200° C. to produce a ceramic product. A desired percentage of sludge ashes can be selected from the range of 2 to 50% to produce a ceramic product with desired properties.

DESCRIPTION OF EMBODIMENTS

Figure 1:
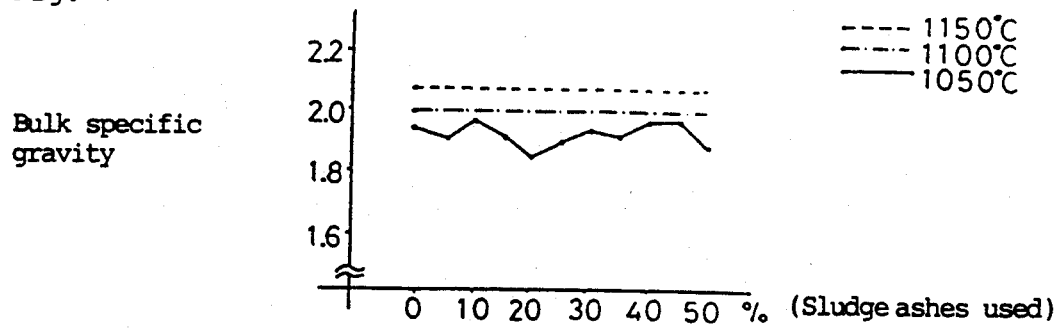
FIG. 1 is a graph related to Example 1, which shows the relationship between the percentage of sludge ashes and the bulk specific gravity of a product.

According to the invention, sludge ashes obtained in a sewage treatment plant can be mixed with a ceramic raw material to produce a ceramic product for use as a construction material. The sludge ashes comprise very fine particles of a yellowish-brown color. Particles of sizes of 40 microns or smaller account for approximately 90 percent of the sludge ashes, and particles of sizes of 5 to 20 microns account for 50 or 60 percent thereof. Thus it is not necessary to reduce the sludge ashes to smaller particles, but the sludge ashes can be used as they are.

Sludge ashes used in examples that will follow had components as shown in Tables 1 and 2. Table 1 shows the components by the percent by weight based on the total weight of sludge ashes, while Table 2 shows the components by the mole in Seger formula:

TABLE 1

| Components of Sludge Ashes (% by weight) | | | | | | | | | |
| --- | --- | --- | --- | --- | --- | --- | --- | --- | --- |
| $K_2O$ | $Na_2O$ | $CaO$ | $MgO$ | $P_2O_5$ | $Al_2O_3$ | $Fe_2O_3$ | $SiO_2$ | $TiO_2$ | Ignition loss |
| 2.09 | 1.61 | 5.35 | 2.05 | 14.9 | 17.3 | 10.9 | 41.5 | 0.75 | 1.21 |

TABLE 2

| Components of Sludge Ashes (mole in Seger formula) | | | | | | | | | |
| --- | --- | --- | --- | --- | --- | --- | --- | --- | --- |
| $K_2O$ | $Na_2O$ | $CaO$ | $MgO$ | $P_2O_5$ | $Al_2O_3$ | $Fe_2O_3$ | $SiO_2$ | $TiO_2$ | Molar equivalent |
| 0.11 | 0.13 | 0.49 | 0.26 | 0.54 | 0.87 | 0.35 | 3.55 | 0.05 | 502 grams |

The invention requires that sludge ashes contain 0.3 to 0.8 mole of CaO in Seger formula, 0.1 to 0.5 mole of MgO in Seger formula, and 0.2 mole or more of $P_2O_5$ in Seger formula. If one or more of these components (namely, CaO, MgO and $P_2O_5$) are not in the specified range of molar quantity, the insufficient component or the other component or components can be intentionally increased to ensure the total specified molar quantity of the three components. By so doing, a ceramic product according to the invention can also be produced.

In the specification and claims, the expression of "mole of a component in Seger formula" is used to mean the molar value of a component as obtained by making a Seger formula of the components of a material (sludge ashes or a usual ceramic raw material) which contains that component as one of the components.

EXAMPLE 1

Earth suitable for the manufacture of a brick was divided into 10 equal parts. Five (5) per cent by weight of sludge ashes was added to one part of the earth, and water was added to the whole. Then, the whole was kneaded to provide a body. In a die, the body was pressed, in a wet process, into an object with dimensions of 62 mm×35 mm×5 mm. The molding thus obtained was dried. Then, the molding was fired for 20 hours in a gas furnace maintained at a temperature of 1,050° C. A ceramic product of the invention was thus produced.

Ten (10) percent (by weight), 15%, 20%, 25%, 30%, 35%, 40%, 45%, and 50% of sludges ashes were added to the remaining nine parts of the earth, respectively, and exactly the same procedure as described above was carried out for each material to produce a ceramic product of the invention.

Thus, a total of ten ceramic products of the invention were produced.

For comparison purposes, no sludge ashes were added to the same kind of earth as described above, and the earth was made into a ceramic product with the same dimensions by the same procedure except that the earth was fired at a temperature of 1,100° C. Similarly, the same kind of earth as described above which contained no sludge ashes was made into a ceramic product with the same dimensions by the same procedure except that the earth was fired at a temperature of 1,150° C.

Figure 2:
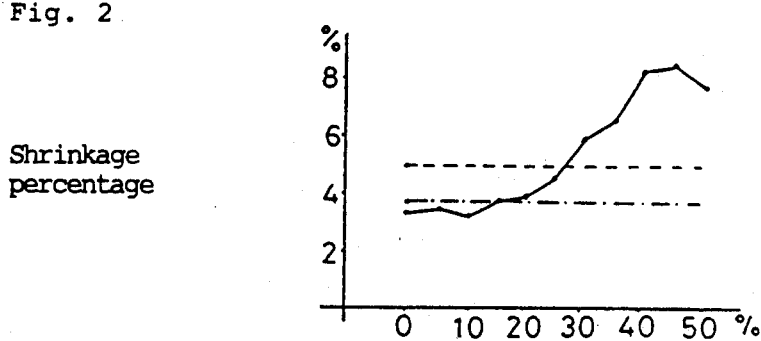
FIG. 2 is a graph related to Example 1, which shows the relationship between the percentage of sludge ashes and the shrinkage percentage of the product.
Figure 3:
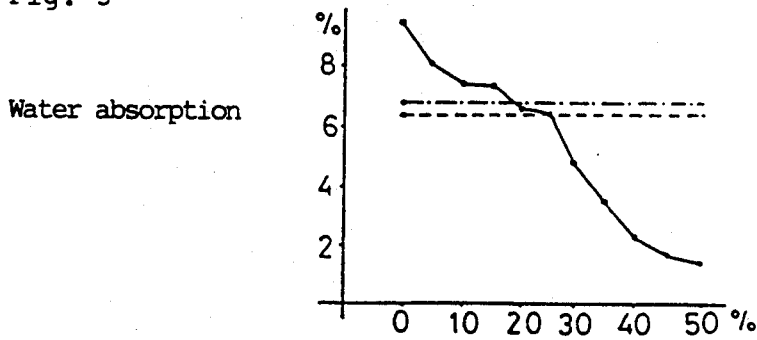
FIG. 3 is a graph related to Example 1, which shows the relationship between the percentage of sludge ashes and the water absorption of the product.
Figure 4:
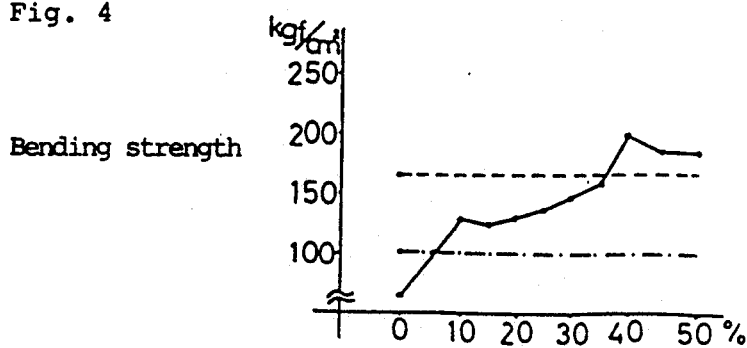
FIG. 4 is a graph related to Example 1, which shows the relationship between the percentage of sludge ashes and the bending strength of the product.

Four major characteristics of each ceramic product of the invention are shown in FIGS. 1 to 4. In each FIG. the characteristic values of the products of the invention are connected by a solid line. FIGS. 1 to 4 also show the same characteristics of the ceramic products produced for comparison purposes. The characteristic values of the product obtained by firing the material at a temperature of 1,100° C. are indicated by dotted lines, while those of the product obtained by firing the material at a temperature of 1,150° C. are indicated by dot-and-dash lines. From FIGS. 1 to 4, Table 3 indicates what percentages of sludge ashes resulted in characteristics equivalent to the characteristics obtained by using only a ceramic raw material. In other words, Table 3 indicates what percentages of sludge ashes should be used in order to be able to produce ceramic products with characteristics equivalent to those of the ceramic products produced for comparison purposes:

TABLE 3

| Percentage of sludge ashes resulting in characteristics equivalent to those of the products produced with no sludge ashes and by firing at 1,100° C. and 1,150° C. | | |
| --- | --- | --- |
| | 1,100° C. | 1,150° C. |
| Bulk specific gravity | No percentage does not result in equivalent values. | |
| Shrinkage percentage | 15% | 25 to 30% |
| Water absorption | 15 to 20% | 25% |
| Bending strength | 5% | 35% |

Thus, a percentage of sludge ashes selected from the range of from 5 to 35% results in a ceramic product which is comparable to the ceramic products for comparison purposes (i.e., the ceramic products produced with no sludge ashes) in at least one characteristic. In addition, as understood from the foregoing, such a ceramic product of the invention was obtained by firing the molded body at a temperature which was 50° or 100° C. lower than the temperature used to fire the molded body with no sludge ashes. Moreover, from FIGS. 3 and 4, it can be said that a higher percentage of sludge ashes results in a road paving brick with a low water absorption and a high bending strength.

The earth used in this Example had components as shown in Tables 4 and 5. Table 4 shows the components by the percent by weight based on the total weight of sludge ashes, while Table 5 shows the components by the mole in Seger formula:

TABLE 4

| Components of Earth (% by weight) | | | | | | | | | |
|---|---|---|---|---|---|---|---|---|---|
| $K_2O$ | $Na_2O$ | CaO | MgO | $P_2O_5$ | $Al_2O_3$ | $Fe_2O_3$ | $SiO_2$ | $TiO_2$ | Ignition loss |
| 2.40 | 1.11 | 0.61 | 0.61 | 0.00 | 18.40 | 2.62 | 68.00 | 0.51 | 5.70 |
| TOTAL 99.96 | | | | | | | | | |

TABLE 5

| Components of Earth (mole in Seger formula) | | | | | | | | | |
|---|---|---|---|---|---|---|---|---|---|
| $K_2O$ | $Na_2O$ | CaO | MgO | $P_2O_5$ | $Al_2O_3$ | $Fe_2O_3$ | $SiO_2$ | $TiO_2$ | Molar equivalent |
| 0.37 | 0.26 | 0.16 | 0.22 | 0.00 | 2.60 | 0.24 | 16.31 | 0.09 | 1441 grams |

In this example and other examples that will follow, the expression of "per cent by weight of sludge ashes" is employed to mean "per cent by weight, based on the total weight of a mixture of sludge ashes and a ceramic raw material, of sludge ashes".

EXAMPLE 2

Earth suitable for the manufacture of a roofing tile was divided into 10 equal parts. Five (5) per cent by weight of sludge ashes was added to one part of the earth, and water was added to the whole. Then, the whole was kneaded to provide a body. In a die, the body was pressed, in a wet process, into an object with dimensions of 62 mm×35 mm×5 mm. The molding thus obtained was dried. Then, the molding was fired for 20 hours in a gas furnace maintained at a temperature of 1,050° C. A ceramic product of the invention was thus produced.

Ten (10) percent (by weight), 15%, 20%, 25%, 30%, 35%, 40%, 45%, and 50% of sludges ashes were added to the remaining nine parts of the earth, respectively, and exactly the same procedure as described above was carried out for each material to produce a ceramic product of the invention.

Thus, a total of ten ceramic products of the invention were produced.

For comparison purposes, no sludge ashes were added to the same kind of earth as described above, and the earth was made into a ceramic product with the same dimensions by the same procedure except that the earth was fired at a temperature of 1,100° C. Similarly, the same kind of earth as described above which contained no sludge ashes was made into a ceramic product with the same dimensions by the same procedure except that the earth was fired at a temperature of 1,150° C.

Figure 5:
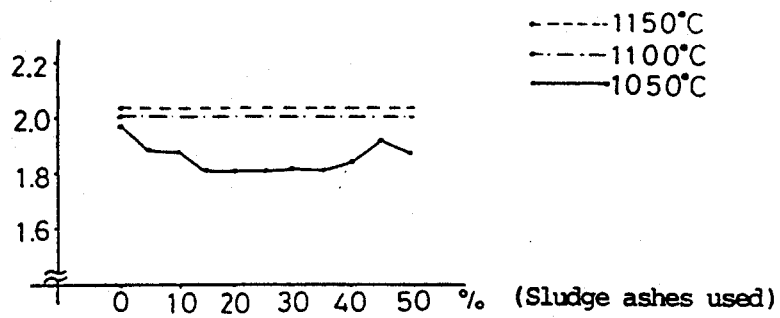
FIG. 5 is a graph related to Example 2, which shows the relationship between the percentage of sludge ashes and the bulk specific gravity of a product.
Figure 6:
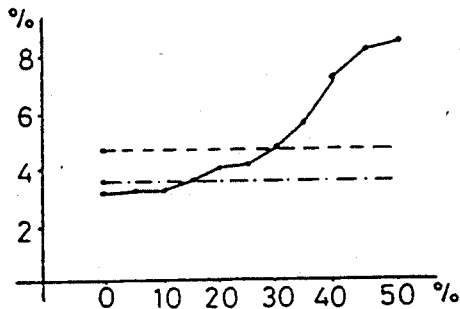
FIG. 6 is a graph related to Example 2, which shows the relationship between the percentage of sludge ashes and the shrinkage percentage of the product.
Figure 7:
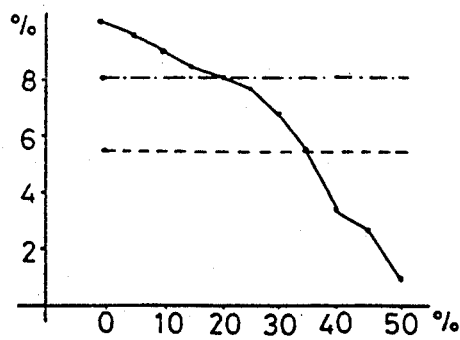
FIG. 7 is a graph related to Example 2, which shows the relationship between the percentage of sludge ashes and the water absorption of the product.
Figure 8:
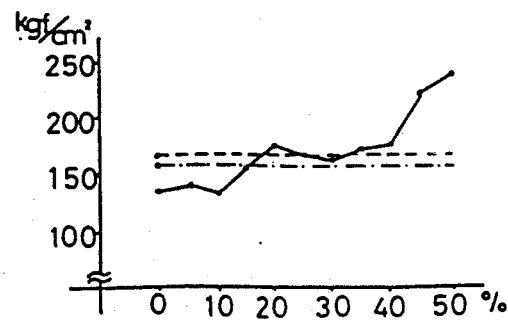
FIG. 8 is a graph related to Example 2, which shows the relationship between the percentage of sludge ashes and the bending strength of the product.

Four major characteristics of each ceramic product of the invention are shown in FIGS. 5 to 8. In each FIG. the characteristic values of the products of the invention are connected by a solid line. FIGS. 5 to 8 also show the same characteristics of the ceramic products produced for comparison purposes. The characteristic values of the product obtained by firing the material at a temperature of 1,100° C. are indicated by dotted lines, while those of the product obtained by firing the material at a temperature of 1,150° C. are indicated by dot-and-dash lines. From FIGS. 5 to 8, Table 6 indicates what percentages of sludge ashes resulted in characteristics equivalent to the characteristics obtained by using only a ceramic raw material. In other words, Table 6 indicates what percentages of sludge ashes should be used in order to be able to produce ceramic products with characteristics equivalent to those of the ceramic products produced for comparison purposes:

TABLE 6

| Percentage of sludge ashes resulting in characteristics equivalent to those of the products produced with no sludge ashes and by firing at 1,100° C. and 1,150° C. | | |
|---|---|---|
| | 1,100° C. | 1,150° C. |
| Bulk specific gravity | No percentage does not result in equivalent values. | |
| Shrinkage percentage | 15% | 25 to 30% |
| Water absorption | 20% | 35% |
| Bending strength | 15% | 15 to 20% |

Thus, a percentage of sludge ashes selected among the range of from 15 to 35% results in a ceramic product which is comparable to the ceramic products for comparison purposes (i.e., the ceramic products produced with no sludge ashes) in at least one characteristic. In addition, as understood from the foregoing, such a ceramic product of the invention was obtained by firing the molded body at a temperature which was 50° or 100° C. lower than the temperature used to fire the molded body with no sludge ashes. Moreover, from FIG. 5, it can be said that the addition of sludge ashes results in a relatively lightweight roofing tile. Also, FIGS. 7 and 8 indicate that a higher percentage of sludge ashes results in a roofing tile with a low water absorption and a high bending strength.

The earth used in this example had components as shown in Tables 7 and 8. Table 7 shows the components by the percent by weight based on the total weight of sludge ashes, while Table 8 shows the components by the mole in Seger formula:

TABLE 7

| Components of Earth (% by weight) | | | | | | | | | |
|---|---|---|---|---|---|---|---|---|---|
| $K_2O$ | $Na_2O$ | CaO | MgO | $P_2O_5$ | $Al_2O_3$ | $Fe_2O_3$ | $SiO_2$ | $TiO_2$ | Ignition loss |
| 2.44 | 0.57 | 0.53 | 0.56 | 0.00 | 17.90 | 2.88 | 68.80 | 0.55 | 5.38 |
| TOTAL 99.61 | | | | | | | | | |

TABLE 8

| K$_2$O | Na$_2$O | CaO | MgO | P$_2$O$_5$ | Al$_2$O$_3$ | Fe$_2$O$_3$ | SiO$_2$ | TiO$_2$ | Molar equivalent |
|---|---|---|---|---|---|---|---|---|---|
| \multicolumn{10}{c}{Components of Earth (mole in Seger formula)} ||||||||||
| 0.44 | 0.16 | 0.16 | 0.24 | 0.00 | 3.00 | 0.31 | 19.59 | 0.12 | 1705 grams |

EXAMPLE 3

Earth suitable for the manufacture of a wall tile was divided into 10 equal parts. Five (5) per cent by weight of sludge ashes was added to one part of the earth, and water was added to the whole. Then, the whole was kneaded to provide a body. Then, the body was dried, and was reduced to finer particles. The finer particles were humidified, and only particles of a suitable size were collected from them. In a die, the particles collected were pressed, in a dry process, into an object with dimensions of 62 mm×35 mm×5 mm under a pressure of 300 kilograms per square centimeter. The molding thus obtained was fired for 20 hours in a gas furnace maintained at a temperature of 1,050° C. A ceramic product of the invention was thus produced.

Ten (10) percent (by weight), 15%, 20%, 25%, 30%, 35%, 40%, 45%, and 50% of sludges ashes were added to the remaining nine parts of the earth, respectively, and exactly the same procedure as described above was carried out for each material to produce a ceramic product of the invention.

Thus, a total of ten ceramic products of the invention were produced.

For comparison purposes, no sludge ashes were added to the same kind of earth as described above, and the earth was made into a ceramic product with the same dimensions by the same procedure except that the earth was fired at a temperature of 1,100° C. Similarly, the same kind of earth as described above which contained no sludge ashes was made into a ceramic product with the same dimensions by the same procedure except that the earth was fired at a temperature of 1,150° C.

Figure 9:
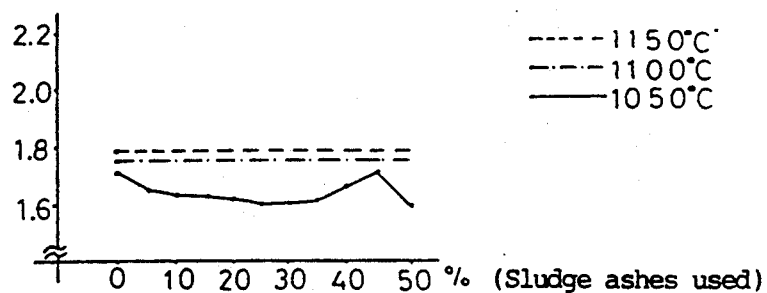
FIG. 9 is a graph related to Example 3, which shows the relationship between the percentage of sludge ashes and the bulk specific gravity of a product.
Figure 10:
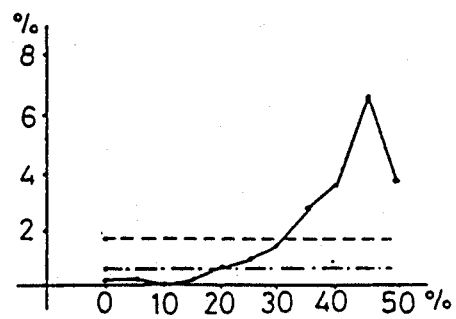
FIG. 10 is a graph related to Example 3, which shows the relationship between the percentage of sludge ashes and the shrinkage percentage of the product.
Figure 11:
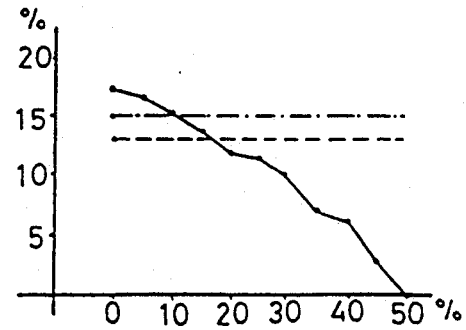
FIG. 11 is a graph related to Example 3, which shows the relationship between the percentage of sludge ashes and the water absorption of the product.
Figure 12:
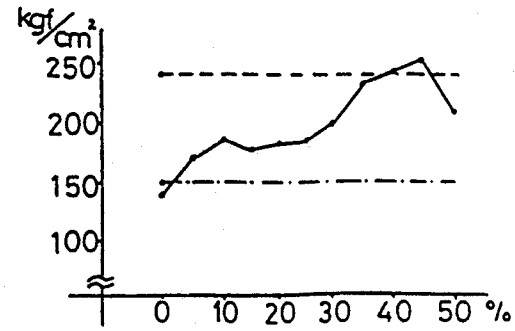
FIG. 12 is a graph related to Example 3, which shows the relationship between the percentage of sludge ashes and the bending strength of the product.

Four major characteristics of each ceramic product of the invention are shown in FIGS. 9 to 12. In each FIG. the characteristic values of the products of the invention are connected by a solid line. FIGS. 9 to 12 also show the same characteristics of the ceramic products produced for comparison purposes. The characteristic values of the product obtained by firing the material at a temperature of 1,100° C. are indicated by dotted lines, while those of the product obtained by firing the material at a temperature of 1,150° C. are indicated by dot-and-dash lines. From FIGS. 9 to 12, Table 9 indicates what percentages of sludge ashes resulted in characteristics equivalent to the characteristics obtained by using only a ceramic raw material. In other words, Table 9 indicates what percentages of sludge ashes should be used in order to be able to produce ceramic products with characteristics equivalent to those of the ceramic products produced for comparison purposes:

TABLE 9

Percentage of sludge ashes resulting in characteristics equivalent to those of the products produced with no sludge ashes and by firing at 1,100° C. and 1,150° C.

|  | 1,100° C. | 1,150° C. |
|---|---|---|
| Bulk specific gravity | No percentage does not result in equivalent values. | |
| Shrinkage percentage | 15 to 20% | 30 to 35% |
| Water absorption | 10% | 15 to 20% |
| Bending strength | 2 to 5% | 40% |

Thus, a percentage of sludge ashes selected from the range of from 2 to 40% results in a ceramic product which is comparable to the ceramic products for comparison purposes (i.e., the ceramic products produced with no sludge ashes) in at least one characteristic. In addition, as understood from the foregoing, such a ceramic product of the invention was obtained by firing the molded body at a temperature which was 50° or 100° C. lower than the temperature used to fire the molded body with no sludge ashes. Moreover, from FIG. 9, it can be said that the addition of sludge ashes results in a relatively lightweight wall tile. Also, FIGS. 11 and 12 indicate that a higher percentage of sludge ashes results in a wall tile with a low water absorption and a high bending strength.

The earth used in this Example had components as shown in Tables 10 and 11. Table 10 shows the components by the percent by weight based on the toal weight of sludge ashes, while Table 11 shows the components by the mole in Seger formula:

TABLE 10

| K$_2$O | Na$_2$O | CaO | MgO | P$_2$O$_5$ | Al$_2$O$_3$ | Fe$_2$O$_3$ | SiO$_2$ | TiO$_2$ | Ignition loss |
|---|---|---|---|---|---|---|---|---|---|
| \multicolumn{10}{c}{Components of Earth (% by weight)} ||||||||||
| 1.57 | 0.45 | 7.29 | 0.25 | 0.00 | 17.40 | 0.70 | 62.30 | 0.36 | 9.57 |
| TOTAL 99.89 |||||||||||

TABLE 11

| K$_2$O | Na$_2$O | CaO | MgO | P$_2$O$_5$ | Al$_2$O$_3$ | Fe$_2$O$_3$ | SiO$_2$ | TiO$_2$ | Molar equivalent |
|---|---|---|---|---|---|---|---|---|---|
| \multicolumn{10}{c}{Components of Earth (mole in Seger formula)} ||||||||||
| 0.10 | 0.05 | 0.81 | 0.04 | 0.00 | 1.07 | 0.03 | 6.48 | 0.03 | 624 grams |

EXAMPLE 4

Earth suitable for the manufacture of a porcelain tile was divided into 10 equal parts. Five (5) per cent by weight of sludge ashes was added to one part of the earth, and water was added to the whole. Then, the whole was kneaded to provide a body. Then, the body was dried, and was reduced to finer particles. The finer particles were humidified, and only particles of a suitable size were collected from them. In a die, the particles collected were pressed, in a dry process, into an object with dimensions of 62 mm×35 mm×5 mm under a pressure of 300 kilograms per square centimeter. The molding thus obtained was fired for 20 hours in a gas furnace maintained at a temperature of 1,050° C. A ceramic product of the invention was thus produced.

Ten (10) percent (by weight), 15%, 20%, 25%, 30%, 35%, 40%, 45%, and 50% of sludges ashes were added to the remaining nine parts of the earth, respectively, and exactly the same procedure as described above was carried out for each material to produce a ceramic product of the invention.

Thus, a total of ten ceramic products of the invention were produced.

For comparison purposes, no sludge ashes were added to the same kind of earth as described above, and the earth was made into a ceramic product with the same dimensions by the same procedure cedure except that the earth was fired at a temperature of 1,100° C. Similarly, the same kind of earth as described above which contained no sludge ashes was made into a ceramic product with the same dimensions by the same procedure except that the earth was fired at a temperature of 1,150° C.

Figure 13:
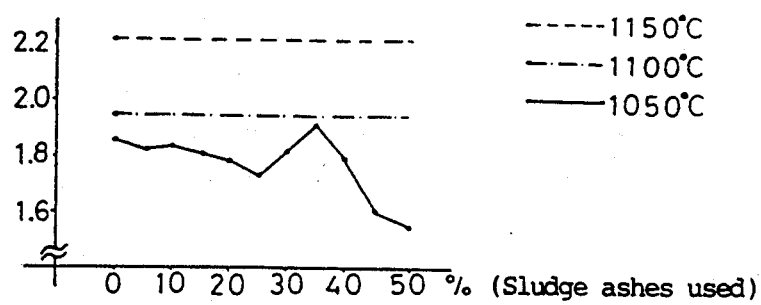
FIG. 13 is a graph related to Example 4, which shows the relationship between the percentage of sludge ashes and the bulk specific gravity of a product.
Figure 14:
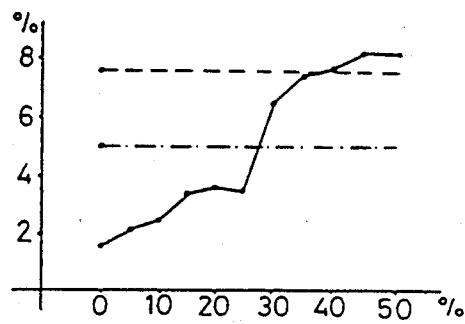
FIG. 14 is a graph related to Example 4, which shows the relationship between the percentage of sludge ashes and the shrinkage percentage of the product.
Figure 15:
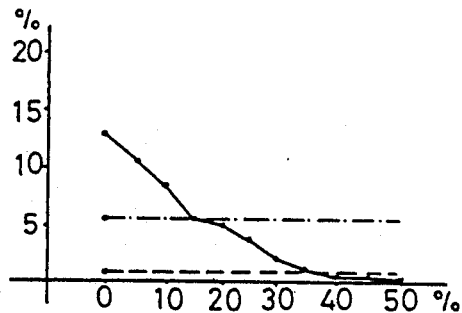
FIG. 15 is a graph related to Example 4, which shows the relationship between the percentage of sludge ashes and the water absorption of the product.
Figure 16:
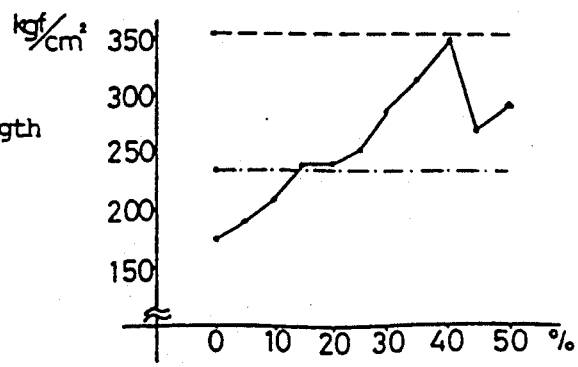
FIG. 16 is a graph related to Example 4, which shows the relationship between the percentage of sludge ashes and the bending strength of the product.

Four major characteristics of each ceramic product of the invention are shown in FIGS. 13 to 16. In each FIG. the characteristic values of the products of the invention are connected by a solid line. FIGS. 13 to 16 also show the same characteristics of the ceramic products produced for comparison purposes. The characteristic values of the product obtained by firing the material at a temperature of 1,100° C. are indicated by dotted lines, while those of the product obtained by firing the material at a temperature of 1,150° C. are indicated by dot-and-dash lines. From FIGS. 13 to 16, Table 12 indicates what percentages of sludge ashes resulted in characteristics equivalent to the characteristics obtained by using only a ceramic raw material. In other words, Table 12 indicates what percentages of sludge ashes should be used in order to be able to produce ceramic products with characteristics equivalent to those of the ceramic products produced for comparison purposes:

ramic product of the invention was obtained by firing the molded body at a temperature which was 50° or 100° C. lower than the temperature used to fire the molded body with no sludge ashes. Moreover, from FIG. 13, it can be said that the addition of sludge ashes results in a relatively lightweight porcelain tile. Also, FIG. 16 indicates that a higher percentage of sludge ashes results in a porcelain tile with a high bending strength.

The earth used in this example had components as shown in Tables 13 and 14. Table 13 shows the components by the percent by weight based on the total weight of sludge ashes, while Table 14 shows the components by the mole in Seger formula:

TABLE 13

| Components of Earth (% by weight) | | | | | | | | | |
|---|---|---|---|---|---|---|---|---|---|
| $K_2O$ | $Na_2O$ | CaO | MgO | $P_2O_5$ | $Al_2O_3$ | $Fe_2O_3$ | $SiO_2$ | $TiO_2$ | Ignition loss |
| 2.71 | 1.46 | 2.43 | 1.85 | 0.00 | 15.70 | 0.59 | 68.80 | 0.29 | 5.92 |
| TOTAL 99.75 | | | | | | | | | |

TABLE 14

| Components of Earth (mole in Seger formula) | | | | | | | | | |
|---|---|---|---|---|---|---|---|---|---|
| $K_2O$ | $Na_2O$ | CaO | MgO | $P_2O_5$ | $Al_2O_3$ | $Fe_2O_3$ | $SiO_2$ | $TiO_2$ | Molar equivalent |
| 0.20 | 0.17 | 0.31 | 0.32 | 0.00 | 1.09 | 0.03 | 8.09 | 0.03 | 705 grams |

Thus, from a comprehensive point of view, it can be said that the addition of 2 to 50% of sludge ashes of the invention ill result in a ceramic product which is comparable to a ceramic product produced by using a ceramic raw material only in at least one characteristic. Also, a ceramic product according to the invention can be produced by firing a molded body at a temperature which is lower than the temperature used to fire a molded body with no sludge ashes. That is, in each Example described the ceramic product of the invention was produced by using a temperature which was 50° to 100° C. lower than the ceramic product with no sludge ashes. If a tunnel kiln is used to fire a molded body, such a lower temperature may result in a saving of at least 20 to 50 kilocalories on the the amount of heat used to fire one kilogram of the molded body. Also, if liquefied petroleum gas is used to fire molded bodies to produce 10,000 cubic meters of bricks per month, such a lower temperature may result in a saving of at least 2 to 5 tons on the amount of gas used per month.

METITORIOUS EFFECTS OF THE INVENTION

From the foregoing, it will be appreciated that a desired percentage of sludge ashes can be added to a ceramic raw material to produce a ceramic product with desired properties. In particular, the greater the percentage of sludge ashes, the smaller the water absorption of a product and the greater the bending strength thereof. Also, although in the prior art a molded body consisting of only a ceramic raw material is fired at a temperature of from 1,000° to 1,280° C., a molded body of the invention can be fired at a temperaure of from 900° to 1,200° C. to produce a ceramic product which is comparable to that produced by firing the molded body of the prior art. Also, although the sludge ashes of the invention in a ceramic product is small in absolute quantity, ceramic products produced according to the invention, such as bricks, are used in large quantities and, hence, the invention is very valu-

TABLE 12

| Percentage of sludge ashes resulting in characteristics equivalent to those of the products produced with no sludge ashes and by firing at 1,100° C. and 1,150° C. | | |
|---|---|---|
| | 1,100° C. | 1,150° C. |
| Bulk specific gravity | No percentage does not result in equivalent values. | |
| Shrinkage percentage | 25 to 30% | 35 to 40% |
| Water absorption | 15% | 35 to 40% |
| Bending strength | 10 to 15% | 40% |

Thus, a percentage of sludge ashes selected from the range of from 10 to 40% results in a ceramic product which is comparable to the ceramic products for comparison purposes (i.e., the ceramic products produced with no sludge ashes) in at least one characteristic. In addition, as understood from the foregoing, such a ceable as a means of utilizing a great amount of sludge in an industrial scale.

What is claimed is:

1. A process for producing a ceramic product for use as a construction material, which comprises
    (a) adding from 2 to 50% by weight, based on the total weight, of sludge ashes to a ceramic raw material, wherein sufficient amounts of CaO, MgO, and $P_2O_5$ have been added to said sludge ashes to produce sludge ashes containing from 0.3 to 0.8 mole of CaO in Seger formula, from 0.1 to 0.5 mole of MgO in Seger formula, and 0.2 mole or more of $P_2O_5$ in Seger formula,
    (b) mixing the whole to prepare a body,
    (c) molding the body into a desired shape, and
    (d) firing the molded body at a temperature of from 900° to 1,200° C.

2. A process for producing a road paving brick, which comprises
    (a) adding from 5 to 35% by weight, based on the total weight, of sludge ashes to earth suitable for the production of bricks wherein sufficient amounts of CaO, MgO, and $P_2O_5$ have been added to said sludge ashes whereby said sludge ashes contain from 0.3 to 0.8 mole of CaO in Seger formula, from 0.1 to 0.5 mole of MgO in Seger formula, and 0.2 mole or more of $P_2O_5$ in Seger formula,
    (b) mixing the whole to prepare a body,
    (c) supplying the body into a die and pressing the body into a desired shape in a wet process, and
    (d) firing the molded body at a temperature of from 900° to 1,200° C.

3. A process for producing a roofing tile, which comprises
    (a) adding from 15 to 35% by weight, based on the total weight, of sludge ashes to earth suitable for the production of a roofing brick wherein sufficient amounts of CaO, MgO, and $P_2O_5$ have been added to said sludge ashes whereby said sludge ashes contain from 0.3 to 0.8 mole of CaO in Seger formula, from 0.1 to 0.5 mole of MgO in Seger formula, and 0.2 mole or more of $P_2O_5$ in Seger formula,
    (b) mixing the whole to prepare a body,
    (c) supplying the body into a die and pressing the body into a desired shape in a wet process, and
    (d) firing the molded body at a temperature of from 900° to 1,200° C.

4. A process for producing a wall tile, which comprises
    (a) adding from 2 to 40% by weight, based on the total weight, of sludge ashes to earth suitable for the production of a wall tile, wherein sufficient amounts of CaO, MgO, and $P_2O_5$ have been added to said sludge ashes whereby said sludge ashes contain from 0.3 to 0.8 mole of CaO in Seger formula, from 0.1 to 0.5 mole of MgO in Seger formula, and 0.2 mole or more of $P_2O_5$ in Seger formula,
    (b) mixing the whole to prepare a body,
    (c) supplying the body into a die and pressing the body into a desired shape in a dry process, and
    (d) firing the molded body at a temperature of from 900° to 1,200° C.

5. A process for producing a porcelain tile, which comprises
    (a) adding from 10 to 40% by weight, based on the total weight, of sludge ashes to earth suitable for the production of a porcelain tile, wherein sufficient amounts of CaO, MgO, and $P_2O_5$ have been added to said sludge ashes whereby said sludge ashes contain from 0.3 to 0.8 mole of CaO in Seger formula, from 0.1 to 0.5 mole of MgO in Seger formula, and 0.2 mole or more of $P_2O_5$ in Seger formula,
    (b) mixing the whole to prepare a body,
    (c) supplying the body into a die and pressing the body into a desired shape in a dry process, and
    (d) firing the molded body at a temperature of from 900° to 1,200° C.

* * * * *